United States Patent [19]
Iwahori et al.

[11] Patent Number: 5,930,127
[45] Date of Patent: Jul. 27, 1999

[54] POWER SOURCE DEVICE

[75] Inventors: Yutaka Iwahori, Kadoma; Hiroichi Shinbori, Kobe; Tsutomu Shiomi, Kita Katsushika-gun; Shinji Hizuma, Ibaraki; Toshiaki Nakamura, Kadoma; Naoki Komatsu, Shijonawate; Takeshi Kamoi, Kadoma, all of Japan

[73] Assignee: Matsushita Electric Works, Ltd., Osaka, Japan

[21] Appl. No.: 09/102,771

[22] Filed: Jun. 23, 1998

[30]      Foreign Application Priority Data

| Jun. 25, 1997 | [JP] | Japan | 9-169185 |
| Jun. 25, 1997 | [JP] | Japan | 9-169186 |
| Feb. 24, 1998 | [JP] | Japan | 10-042648 |

[51] Int. Cl.$^6$ .................................................. H02M 5/458
[52] U.S. Cl. ............................. 363/37; 363/80; 363/124; 315/247; 315/307
[58] Field of Search .................................. 363/36, 37, 79, 363/80, 98, 124, 126; 315/247, 307

[56]              References Cited
              U.S. PATENT DOCUMENTS

| 4,933,831 | 6/1990 | Takahashi | 363/132 |
| 4,949,016 | 8/1990 | DeBijl et al. | 315/208 |
| 5,063,490 | 11/1991 | Maehara et al. | 363/37 |
| 5,274,540 | 12/1993 | Maehara | 363/37 |
| 5,459,651 | 10/1995 | Maehara | 363/34 |
| 5,712,536 | 1/1998 | Haas et al. | 315/247 |
| 5,737,207 | 4/1998 | Uratani et al. | 363/132 |
| 5,777,861 | 7/1998 | Shimizu et al. | 363/37 |

*Primary Examiner*—Adolf Deneke Berhane
*Attorney, Agent, or Firm*—Burns, Doane, Swecker & Mathis, L.L.P.

[57]              ABSTRACT

A power source device is so arranged that one of switching elements forming a plurality of power conversion switching circuits which is used in common during each switching cycle is made to have a switching period in which mainly a current is taken up from a power source of first one of the switching circuits, the switching period being varied in a zone in which an input voltage is higher than a predetermined voltage in a cycle of input voltage waveform. Any distortion of input current waveform occurring around lower voltage period of commercial AC source is thereby reduced, in the power source device wherein the power conversion switching circuits employ commonly the switching elements.

17 Claims, 16 Drawing Sheets

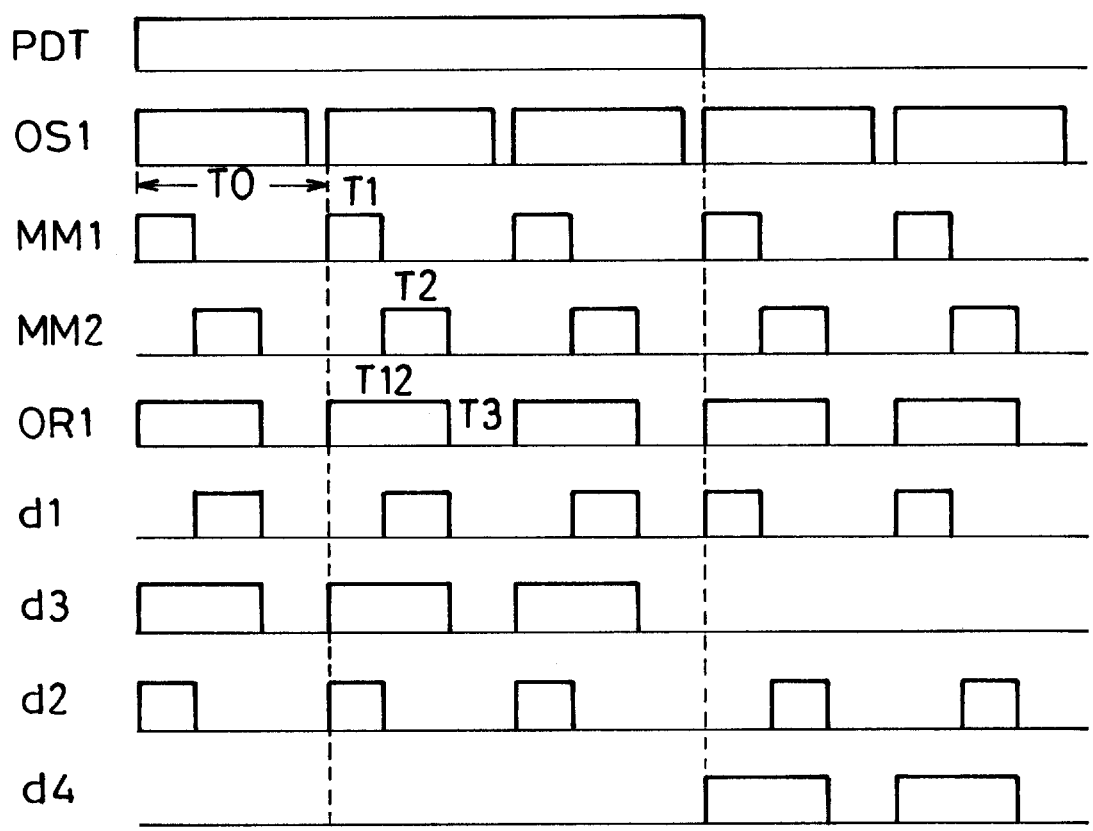

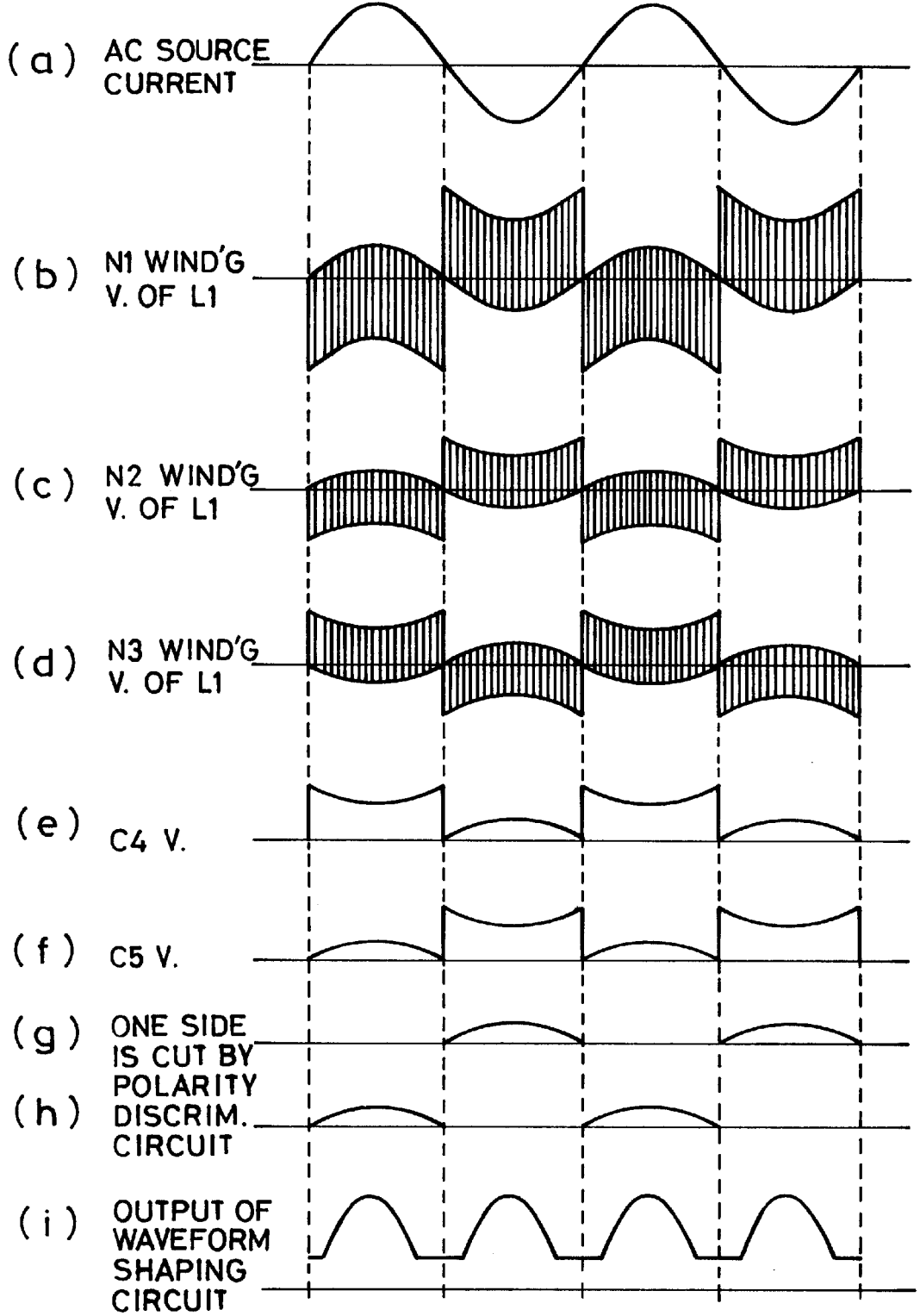

POWER SOURCE DEVICE

BACKGROUND OF THE INVENTION

This invention relates to power source devices for obtaining a square wave output of low frequency with a commercial AC source employed and, in particular, to a power source device suitable for use in discharge lamp lighting devices in which the input is made high in the power factor.

DESCRIPTION OF RELATED ART

In recent years, it has been demanded, for electric machines and equipments using the commercial AC source with respect to any problems due to high harmonics in the system of the commercial AC source, to render the output to be closer to sinusoidal wave substantially equal to the source voltage and to be high in the power factor, with the high harmonics of the input current reduced. Even discharge lamp lighting device is not exceptional, and it has been well known that a boost converter is employed as a power factor correction (PFC) so as to light the discharge lamp by means of an inverter with an output DC voltage received from this chopper. In a discharge lamp lighting device for a high intensity discharge lamp (HID), for example, too, it has been suggested to constitute the power factor correction with the boost converter at input stage, and with a combined circuit of a power conversion circuit by means of a buck converter with a polarity switching circuit for switching the polarity at a lower frequency or a combination of such combined circuits employed at a subsequent stage, so that the high harmonics distortion in the commercial input current could be reduced to be high in the power factor and the HID lamp could be stably lighted with a low frequency square wave.

However, such arrangement of the power factor improving circuit employing the boost converter at the input stage has had to be increased in the number of circuit parts, so that it has been unable to avoid costs from increasing and dimensions from enlarging. Accordingly, there have been suggested various circuit arrangements for restraining the increase in the required parts number and in the costs minimizing relatively the dimensions of the machines and equipments, by coupling the power conversion circuit with the power factor correction for lighting the discharge lamp.

In U.S. Pat. No 4,949,016, for example, there has been suggested an arrangement for reducing the distortion in the input current waveform while applying an AC voltage to the load by means of the combination of the boost converter and inverter.

U.S. Pat. No. 5,063,490 discloses an arrangement for reducing the number of switching elements and applying to the load a low frequency square wave by using the switching elements in common for the boost converter and low-frequency inverter which are employed as combined with each other.

WO98/10509 discloses an arrangement for reducing any loss in the switching elements, in addition to the arrangement of the foregoing U.S. Pat. No. 5,063,490.

For the purpose of promoting the understanding of the present invention, conventional arrangements of the discharge lamp lighting device including the foregoing known patents shall be detailed in the followings.

A power source device shown in FIG. 1 is provided with a useful means for reducing any increment in a current to the switching elements while simultaneously carrying out the conversion of powers to the power factor correction and to the output at switching cycle. In this case, the power source device comprises an AC power source AC, high speed switching elements Q1–Q4, diodes D5 and D6, inductor elements L1 and L2, DC smoothing capacitor EC, output smoothing capacitor C1 and load R.

A control circuit for the power source circuit shown in FIG. 1 is shown in FIG. 5, and this control circuit includes driving circuits DRV1–DRV4 respectively for the switching elements Q1–Q4 and an oscillator OS1 of a basic high frequency signal. Referring to the operation of this circuit with reference also to FIG. 6, a signal is generated for a period T1 by a monostable multivibrator MM1 triggered by the high frequency signal. With fall of this signal for the period T1, a monostable multivibrator MM2 is triggered, and a signal is generated for a period T2. This signal for the period T2 is logically added to the signal for the period T1 at an "or" circuit OR1, and a signal for a period T12 (=T1+T2) is generated. A source polarity discriminator PDT provides a signal according to the polarity of the commercial AC power source AC so that, when the polarity of a voltage V1 is in the direction shown by an arrow in FIG. 1, a signal Po at H level is output. These signals are properly synthesized at a gate circuit comprising "or" circuits OR2 and OR3 and "and" circuits AND, so that driving signals d1, d2, d3 and d4 for the switching elements Q1–Q4 are generated at such timing as shown in FIG. 6.

That is, in an event where the polarity (+,−) of the commercial AC source AC is as shown in the drawing, the switching elements Q3 and Q2 are first turned ON, the switching element Q1 is turned ON simultaneously with turning OFF of the switching element Q2 after the period T1, all switching elements are turned OFF after the period T2, and this switching cycle is repeated again at a cycle To of the oscillator OS1. In an event where the polarity of the commercial AC source AC is reverse to that shown in the drawing, the polarity discrimination signal of the source polarity discriminater PDT is reversed, and the switching operation is changed over as in FIG. 6. That is, the switching elements Q1 and Q4 are first turned ON, the switching element Q2 turns ON simultaneously with turning OFF of the switching element Q1 after the period T1, all switching elements are turned OFF after the period T2, and this switching cycle is repeated at the cycle To of the oscillator OS1 again.

Referring more in detail to the foregoing operation, the negative polarity of the commercial AC source AC on the side of the node between the switching elements Q1 and Q2 causes the operation to take place in the sequence of the period T1 in which the switching elements Q2 and Q3 are turned ON, the period T2 in which the switching elements Q1 and Q3 are turned ON, and the period T3 in which the switching elements Q1–Q4 are all turned OFF, whereas the positive polarity of the commercial AC source AC on the side of the node between the switching elements Q1 and Q2 causes the operation to take place in the sequence of the period T1 in which the switching elements Q1 and Q4 are made ON, the period T2 in which the switching elements Q2 and Q4 are made ON, and the period T3 in which the switching elements Q1–Q4 are all turned OFF.

The foregoing power source device includes a first power conversion circuit CNV1 constituting a boost converter, and a second power conversion circuit CNV2 constituting a buck converter, and the switching elements Q1 and Q2 are utilized commonly in both power conversion circuits. Here, the operation upon the negative polarity of the commercial AC source AC on the side of the node between the switching elements Q1 and Q2 shall be described with reference to the respective power conversion circuits constituting the buck and boost converters. Referring initially to the first power conversion circuit constituting the boost converter, the period T2 for turning ON the switching elements Q1 and Q3 is a period in which an energy is charged in the inductor L1 acting as a choke of the boost converter, whereas the period T3 for turning OFF the switching elements Q1–Q4 as well as the period T1 for turning ON the switching elements Q2 and Q3 are for discharging the energy stored in the inductor L1. Referring next to the second power conversion circuit constituting the buck converter, the period T1 in which the switching elements Q2 and Q3 are made ON is a period for which an energy is charged in the inductor L2 acting as a choke of the voltage dropping chopper, whereas the period T2 for turning ON the switching elements Q1 and Q3 as well as the period T3 for turning OFF the switching elements Q1–Q4 are for discharging the energy stored in the inductor L2.

In the foregoing prior art, on the other hand, the manner in which the current flows at the respective switching modes becomes slightly different, in an event when the source voltage is low or the inductor L1 is large, even though the switching operation is the same. Referring to the operation in the case of the negative polarity of the commercial AC power source AC on the junction side of the switching elements Q1 and Q2, noticing the loop of current flowing, the period T1 for turning ON the switching elements Q2 and Q3 is a period in which a current of the second power conversion circuit satisfies a state in which a closed loop comprising the smoothing capacitor EC, switching element Q3, inductor L2, load R and switching element Q2 is constituted, the period T2 for turning ON the switching elements Q1 and Q3 is a period that simultaneously satisfies both states at one of which the current of the first power conversion circuit constitutes a closed loop comprising the commercial AC source AC, inductor L1, diode D5 and switching element Q1 and at the other of which the current of the second power conversion circuit forms a closed loop comprising the inductor L2, load R, switching element Q1 and switching element Q3, and the period T3 for turning OFF all the switching elements Q1–Q4 causes following two states to occur depending on the relative size of the currents flowing to the inductors L1 and L2.

First, in an event where the absolute value of the current of the inductor L1 is smaller than the absolute value of the current of the inductor L2 (such as at a valley portion of AC), there are satisfied simultaneously a state at which the current of the first power conversion circuit forms a closed loop including the commercial AC source AC, inductor L1, diode D5, and switching element Q1, and a state at which the current of the second power conversion circuit forms a closed loop including the inductor L2, load R, switching element Q1, smoothing capacitor EC and switching element Q4. Further, upon coincidence of the absolute value of the current of the inductor L1 with the absolute value of the current of the inductor L2, the currents of the first and second power conversion circuits are mutually cancelled, consequent to which the sum total of the currents flowing into the common-use switching elements becomes zero, so that there is formed no current loop through the common-use switching elements practically within the respective power conversion circuits, and there is satisfied a state at which a closed loop comprising the inductor L1, diode D5, smoothing capacitor EC, switching element Q4, inductor L2, load R and commercial AC source AC. Since no closed current loop is formed through the common-use switching elements, no current flows at all to the switching elements Q1 and Q2 even though the power conversion circuits are in operation, and there occurs no power loss.

With such foregoing circuit arrangement as shown in FIG. 1, it is possible to obtain at a high efficiency a rectangular wave output in synchronism with the polarity of the commercial AC source AC by means of the two boost and buck converters coupled while the boost converter necessarily forming the first power conversion circuit functions as a power factor correction, and a power conversion device capable of lowering the costs and minimizing the size of the device can be provided.

However, while a series of switching cycles will be equal for each cycle of the source AC, that is, each cycle of its output, and it can be expected that the output waveform will be a square wave so long as the smoothing capacitor EC is of a large capacity and substantially of a constant voltage, when the switching period in which a power is supplied mainly to the load R from the smoothing capacitor EC and the switching period in which the energy from the source AC is accumulated in the inductor L1 are fixed to a predetermined time, there is seen a phenomenon of a decrement in the output around the valley portion of the source voltage, in practice, notwithstanding that the voltage at the smoothing capacitor EC is substantially constant.

The above is for the reason that there arises a difference in the current path at the hill and valley portions of the source voltage as seen in FIGS. 7 and 8. That is, in FIGS. 7(a)–7(d) and FIGS. 8(a)–8(d), switching conditions are the same in the periods and paths of FIGS. 7(a), 7(b) and FIGS. 8(a), 8(b), but a difference in the path occurs in the state of FIGS. 7(c) and 8(c). While in FIG. 7(c) a flywheel current flow through the diodes D2 and D4 is occurring in the loop of current to the load, a regenerative energy is supplied to the smoothing capacitor EC through the diodes D1 and D4 in FIG. 8(c). At this time, the voltage at the smoothing capacitor EC is applied as an inverse voltage to the load and inductor L2, due to which the current is quickly reduced to lower the output voltage.

Further, since the period of FIG. 8(c) continues until the currents i1 and i2 respectively flowing to the inductors L1 and L2 become mutually equal, the period of FIG. 8(c) is prolonged longer as the source voltage is lower and a difference between the currents i1 and i2 at the time of shift from FIG. 8(b) to FIG. 8(c) is larger, and the output is lowered. In the case of such waveform as the sinusoidal wave in which the absolute value of the source voltage varies during each cycle, therefore, there arises a ripple in the output. Further, in an event where the voltage of the smoothing capacitor is lowered, there arises a problem that the input current is distorted to become triangular waveform as boosting ratio of the boost converter is lowered.

SUMMARY OF THE INVENTION

An object of the present invention is to solve the foregoing problems, and, in the power source devices in which a plurality of power conversion switching circuits employ in common the switching elements, any distortion in the input current waveform occurring around lower voltage portion of the commercial AC power source is reduced.

This object can be realized by means of a power source device for providing to a load circuit an AC voltage synchronized with an AC power source, the device comprising a first series circuit of first and second switching elements coinciding in their forward direction and respectively having a backward current passing element connected in parallel to the switching element, a second series circuit of third and fourth switching elements coinciding in their forward direction and respectively having a backward current passing element connected in parallel to the switching element, a third series circuit of two rectifying elements, a smoothing capacitor to which the first, second and third series circuits are connected in parallel, a first inductor connected through the AC power source between a node of the switching elements in the first series circuit and a node of the two rectifying elements in the third series circuit, and a second inductor connected through a load circuit between a node of the switching elements in the first series circuit and a node of the switching elements in the second series circuit; the arrangement constituting a boost converter connected to the AC source and including at least the switching elements and first inductor, a buck converter connected to the smoothing capacitor and including at least the switching elements and second inductor, and a control circuit for controlling the operation of the first to fourth switching elements such that at least one of the switching elements employed in the respective buck and boost converters is commonly used in these converters and the operation includes at least a period in which a current flowing upon a voltage boosting operation and a current flowing upon a voltage dropping operation flow through the commonly used switching elements respectively in a direction in which they cancel each other; wherein the device provides control states including first to third switching states, at the first state of which a closed circuit including the load circuit and second inductor is formed with respect to both ends of the smoothing capacitor and an open circuit including the first inductor is formed across the AC power source, at the second state of which a closed circuit including the first inductor is formed across the AC power source, and at the third state of which energy accumulated in the first and second inductor is discharged, the period of the first switching state being varied at least at one cycle of the AC power source.

Other objects and advantages for the present invention shall be made clear in the following description of the invention detailed with reference to respective embodiments according to the present invention as shown in accompanying drawings.

BRIEF DESCRIPTION OF THE DRAWINGS

FIG. 6 is an operational waveform diagram of the basic control circuit of FIG. 5;

FIG. 15 is an operational waveform diagram for the control circuit of FIG. 14.

Figure 1:
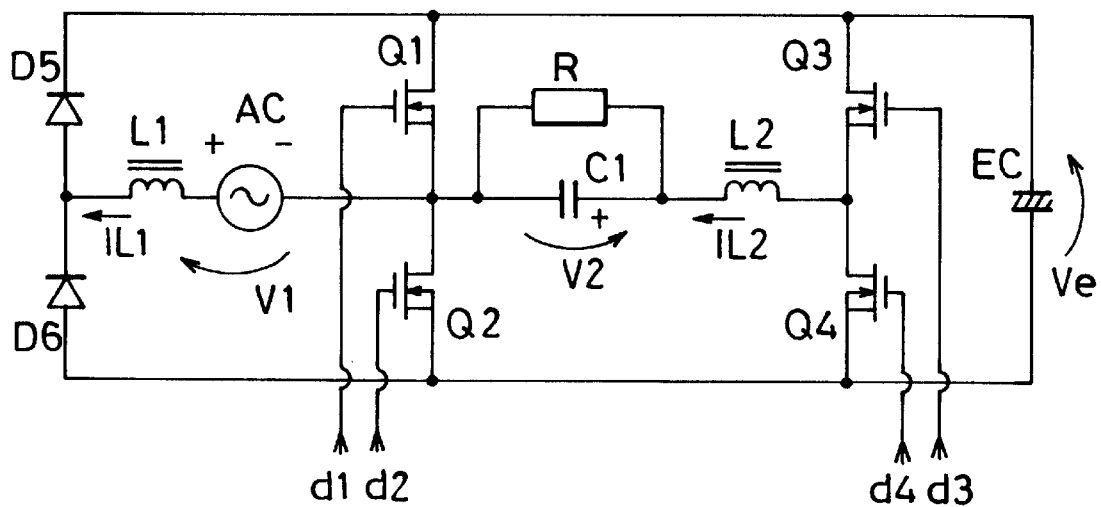
FIG. 1 is a circuit diagram showing a basic arrangement of main circuit in the power source device to which the present invention relates.

While the present invention shall now be described in the followings with reference to the respective working aspects of the invention shown in the drawings, it should be appreciated that the intention is not to limit the invention only to these embodiments shown but rather to include all alterations, modifications and equivalent arrangements possible within the scope of appended claims.

DETAILED DESCRIPTION OF THE PREFERRED EMBODIMENTS

Embodiment 1

Figure 2:
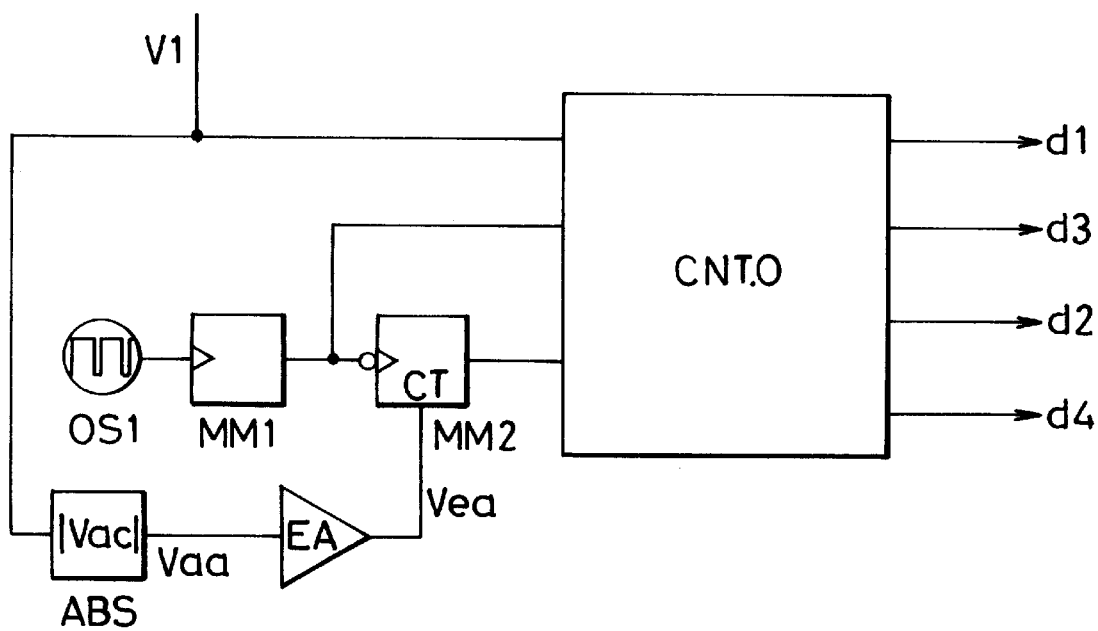
FIG. 2 is a block circuit diagram showing an embodiment of a control circuit according to the present invention for the device of FIG. 1.

Embodiment 1 of the present invention shall be described with reference to FIG. 1 of the basic circuit arrangement and additionally to FIG. 2 showing the control circuit of the present invention. The control circuit of FIG. 2 is an improvement of the basic circuit of FIG. 5, and an absolute value detector ABS and an error amplifier EA are additionally provided to the control circuit of FIG. 5. A monostable multivibrator MM2 determining a switching period T2 is a voltage controlling monostable multivibrator which operates for rendering the switching period T2 to be variable in response to a voltage applied to a control input terminal CT of the multivibrator MM2.

Figure 3:
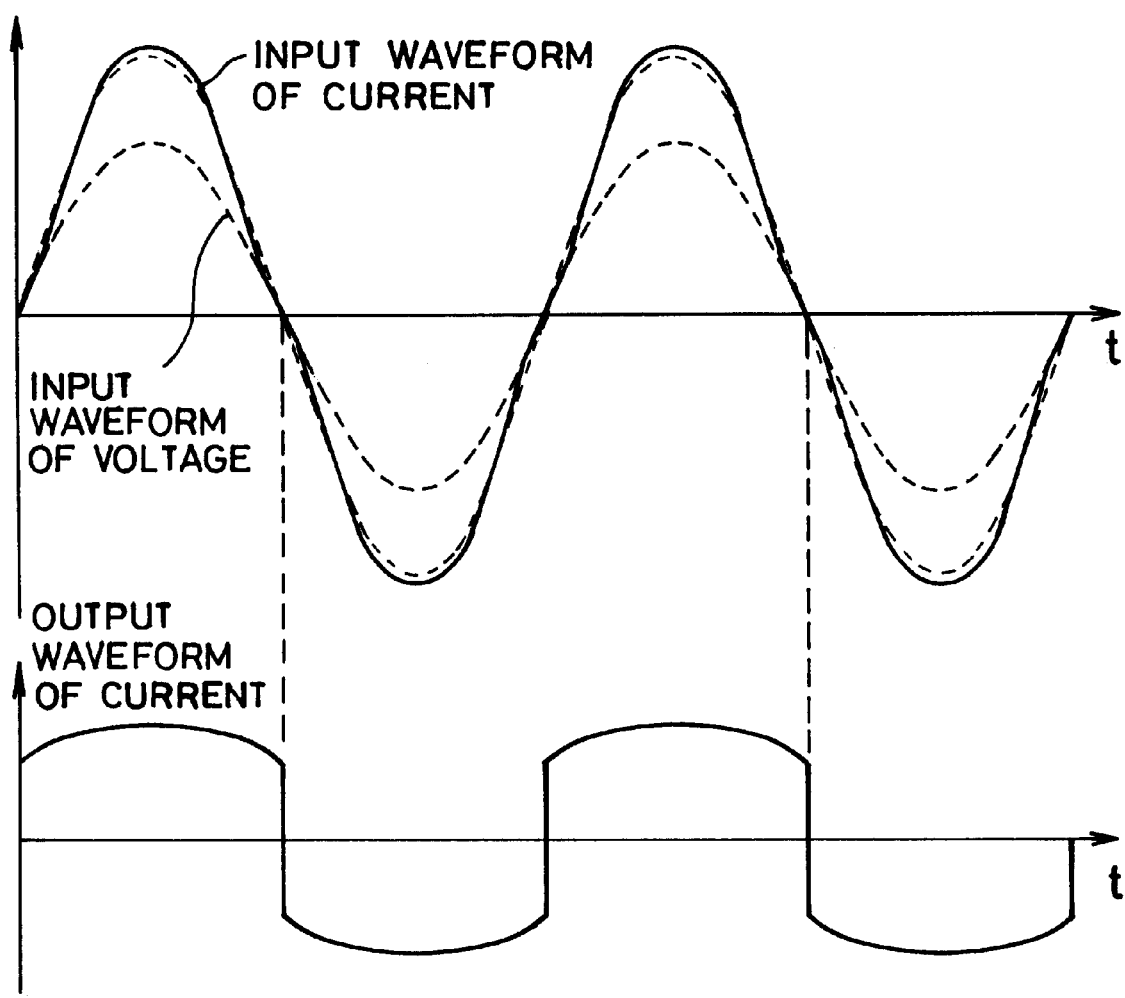
FIG. 3 is an input current waveform diagram for a main circuit employing the control circuit shown in FIG. 2.

In this case, an absolute value Vaa of an instantaneous voltage of the commercial AC power source AC is detected by the detector ABS, a difference of this detected value from a reference value is measured as compared at the error amplifier EA, and thus obtained error voltage Vea is applied to the control input terminal CT of the monostable multivibrator MM2. A so-called PWM control is performed such that, when the voltage of the source AC is high, the switching period T2 is made shorter but, when the source voltage is low, the switching period T2 is made longer, whereby an insufficient current at the valley portion of the source voltage is complemented with an input from the source AC, and the input current is improved in the average value waveform as shown in FIG. 3.

Embodiment 2

Figure 4:
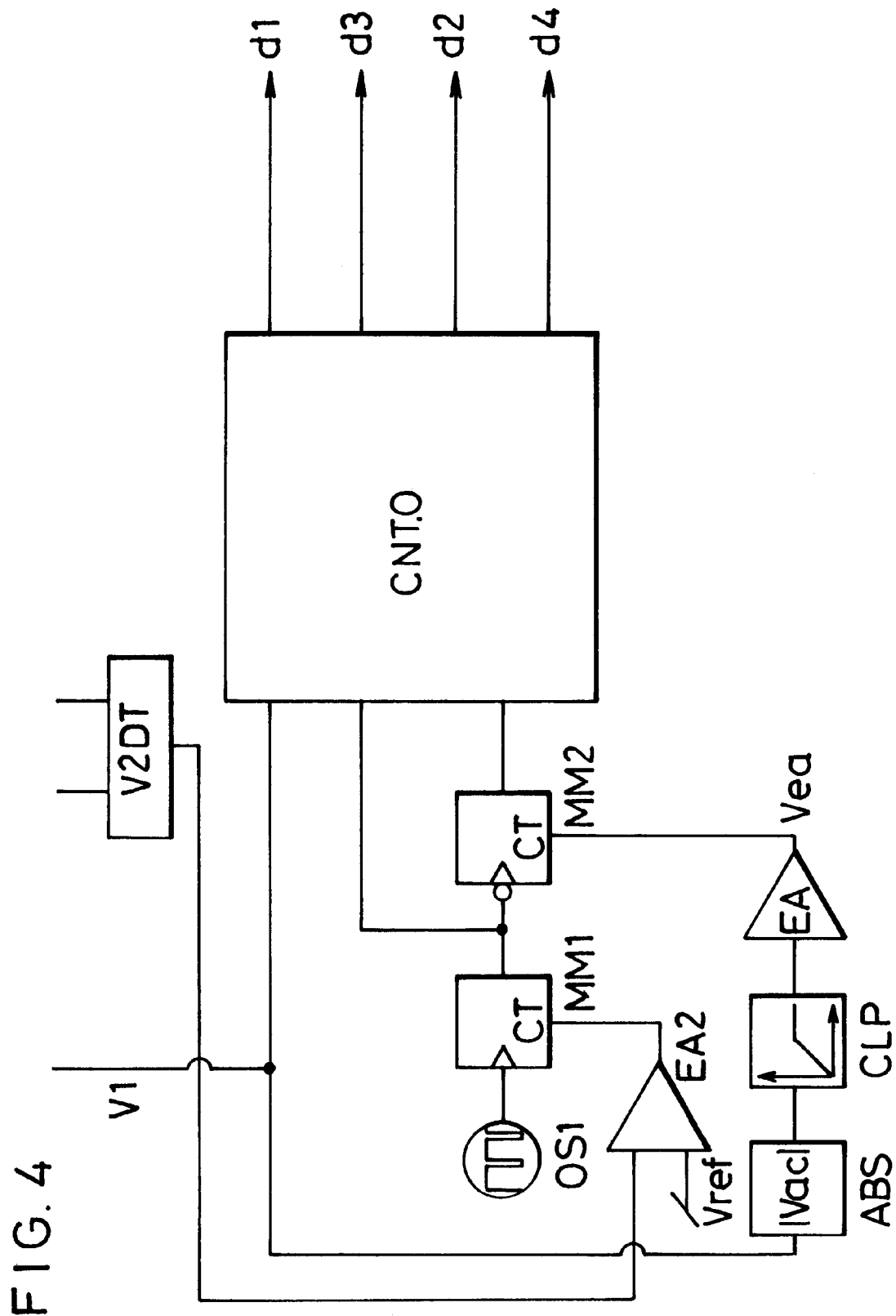
FIG. 4 is a block circuit diagram of another embodiment of the control circuit according to the present invention.
Figure 5:
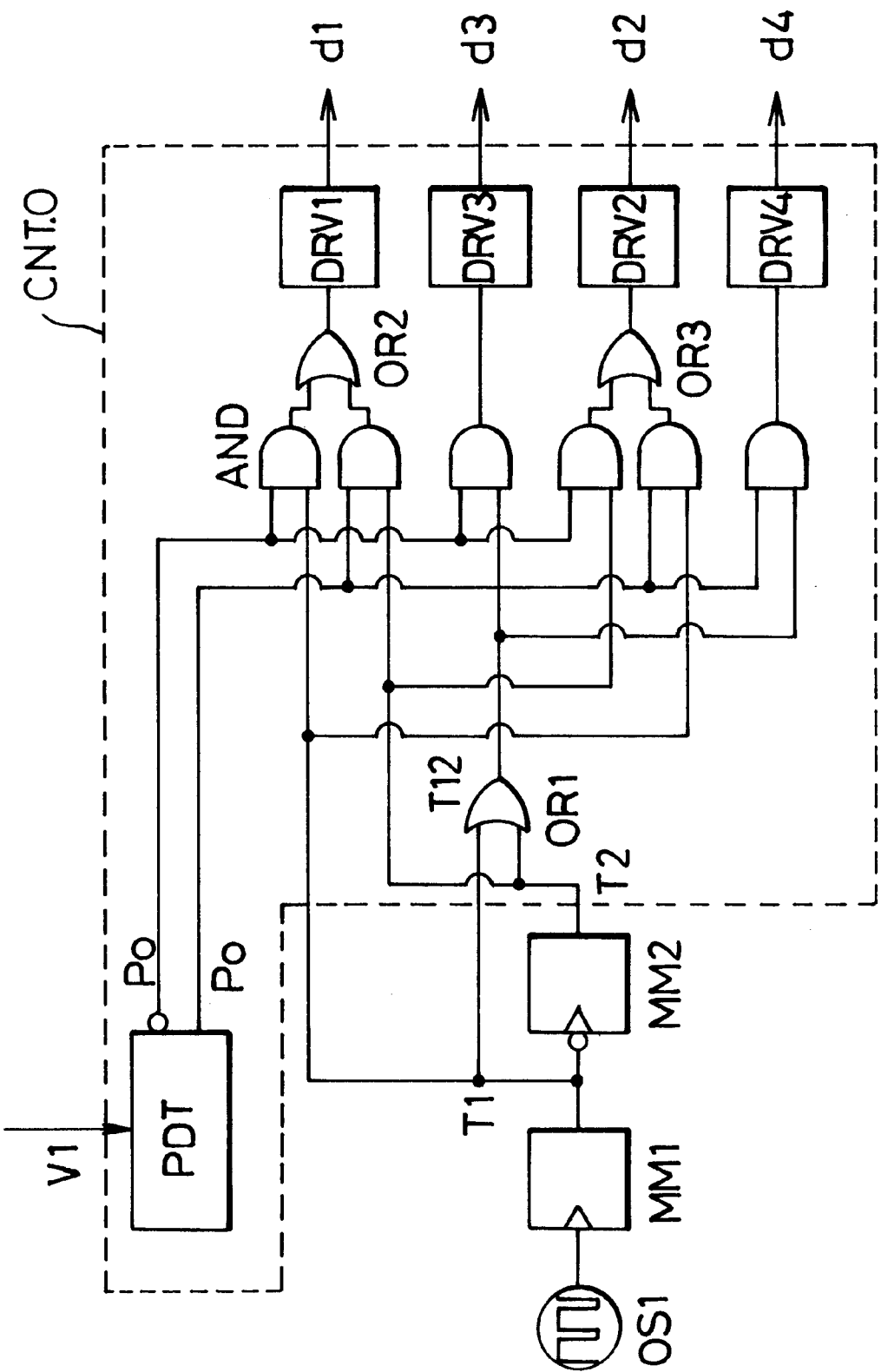
FIG. 5 is a block circuit diagram showing a basic arrangement of the control circuit.

In Embodiment 2 of the present invention, such control circuit as shown in FIG. 4, as an improvement of the control circuit of FIG. 5 employed in the basic circuit of FIG. 1, is used. That is, in Embodiment 2, there are added a load voltage detector V2DT, absolute value detector ABS for the source voltage, clamping circuit CLP and error amplifiers EA and EA2. The monostable multivibrators MM1 and MM2 determining the switching periods T1 and T2 are both the voltage controlling monostable multivibrator, and are arranged for varying the switching periods T1 and T2 in response to the voltage applied to the control input terminal CT.

The foregoing Embodiment 1 is effective in improving any distortion in the input current waveform and, when the same is employed in, for example, the HID lighting device, it is required to obtain the flattest possible output for a stable lighting. However, the square wave of the output current is generally not flat but involves a distortion. In order to attain a stabilization of the output, therefore, the present Embodiment 2 is additionally provided with means for performing the PWM control of the period T1 to render the load voltage V2 to be substantially constant with a voltage of the error amplifier EA2 applied to the control terminal for the period T1 provided to the monostable multivibrator MM1, by detecting the load voltage V2 at the detector V2DT and comparing thus detected voltage V2 with the reference voltage Vref at the error amplifier EA2.

Embodiment 3

Figure 9:
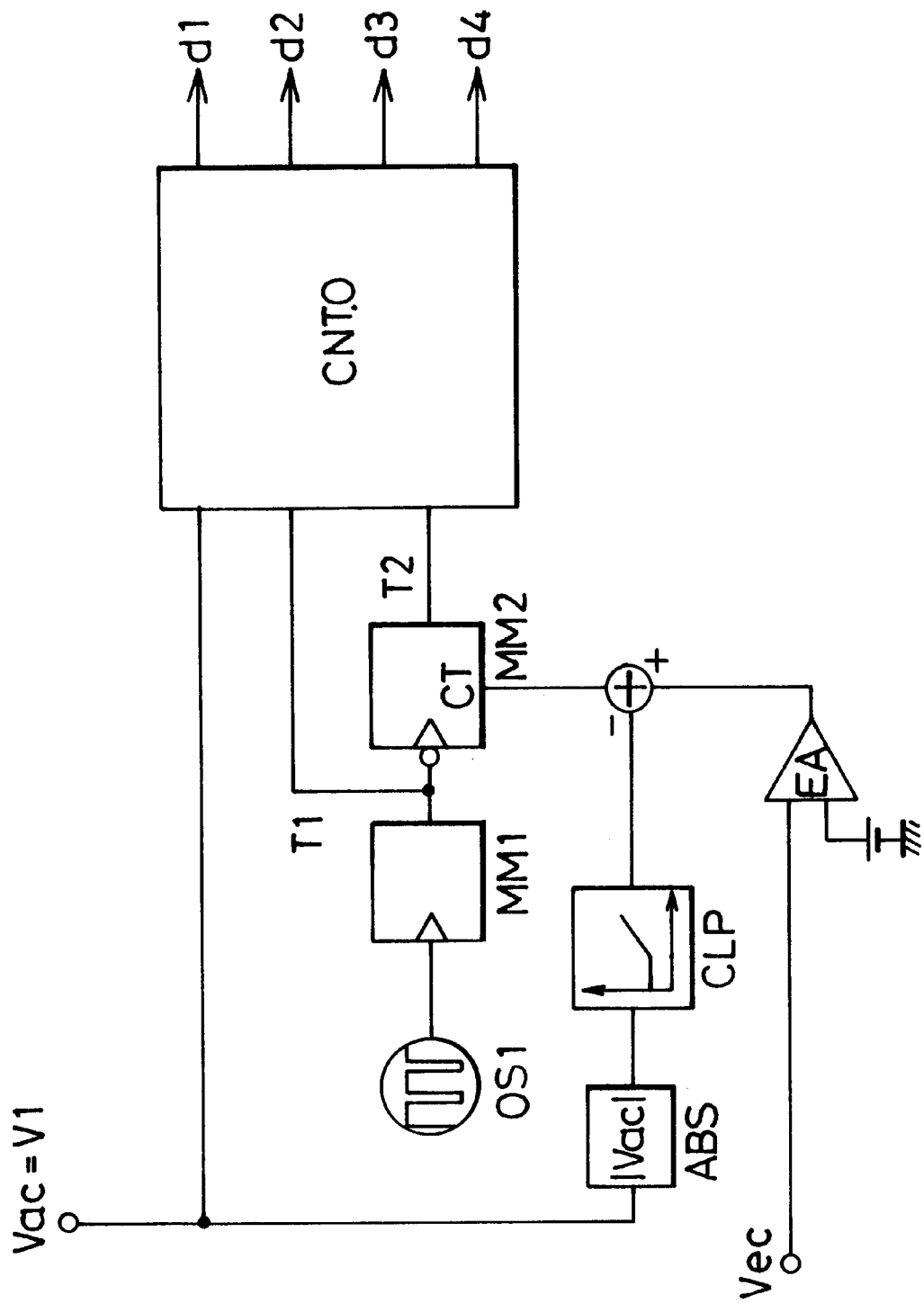
FIG. 9 is a block circuit diagram showing another embodiment of the control circuit according to the present invention.

Another Embodiment 3 of the present invention is described with reference to FIG. 9 showing a control circuit in addition to FIG. 1 of the basic circuit. In this case, the control circuit of FIG. 9 is an improvement of the basic control circuit shown in FIG. 5, to the latter of which the absolute value detector ABS for the source voltage, clamping circuit CLP and error amplifier EA for detecting a voltage Vec of the smoothing capacitor EC are provided. The switching period T2 is determined by the monostable multivibrator MM2 which is of the voltage controlling type and operates for varying the switching period T2 in response to the voltage applied to the control input terminal CT of the monostable multivibrator MM2.

Figure 10:
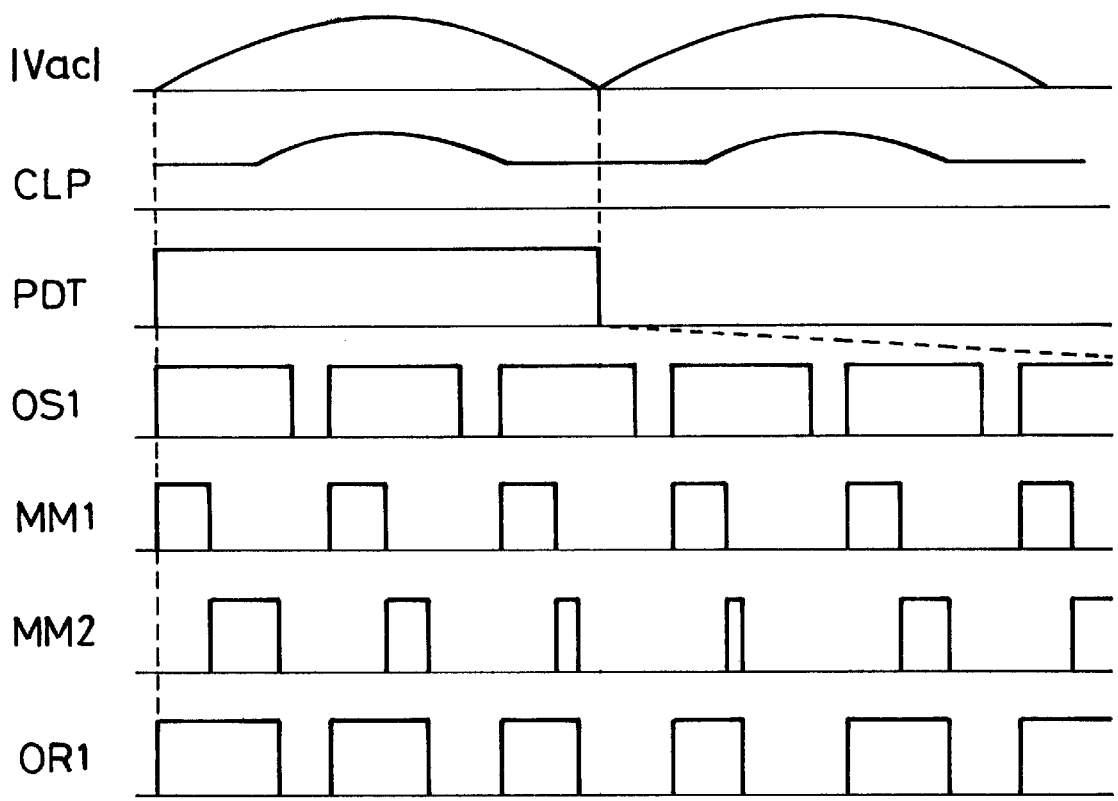
FIGS. 10 and 11 are operational waveform diagrams of the control circuit of FIG. 9.

Signal waveforms at respective parts in the control circuit of the present Embodiment 3 are as shown in FIG. 10. First, an absolute value of the instantaneous voltage of the commercial AC source voltage Vs is detected at the detector ABS, and any detected voltage below a predetermined value is rendered to be a predetermined value by the clamping circuit CLP. Also, as it is confirmed by the error amplifier EA that the voltage across the smoothing capacitor EC has reached the predetermined value, a voltage shaped in the waveform at the clamping circuit CLP is applied to the control input terminal CT of the monostable multivibrator MM2. As a result, as shown by signal waveforms of FIG. 10, the PWM control is carried out so that, when the commercial AC source voltage Vs is lower than the predetermined voltage, the predetermined switching period T2 is maintained but, when the source voltage Vs is higher than the predetermined voltage, the switching period T2 is made shorter.

Figure 11:
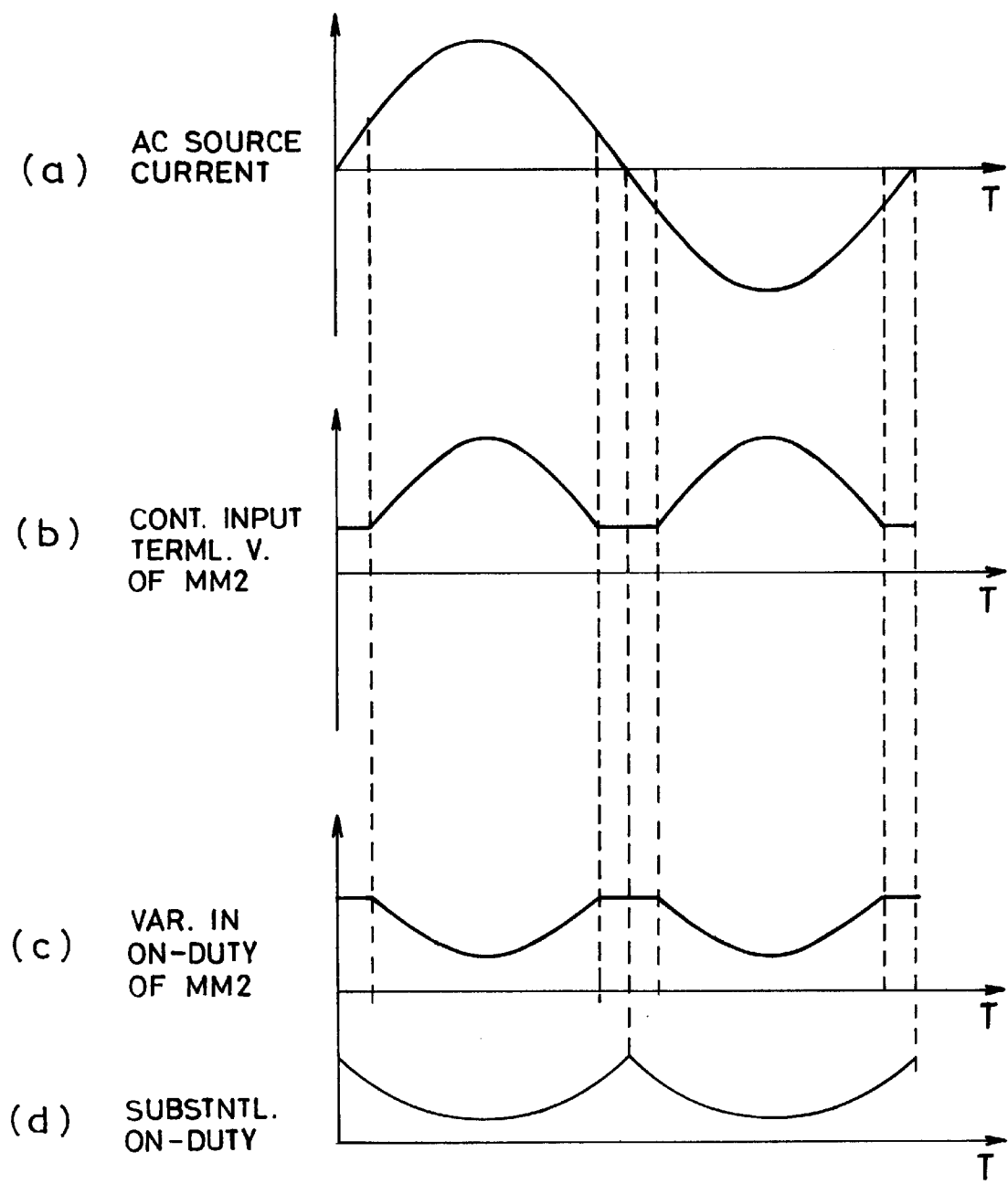

Variation in the control input terminal voltage of the monostable multivibrator MM2 due to the source voltage Vs in the present Embodiment 3 and variation in the ON-duty due thereto are shown in FIG. 11(a)–11(c). As a result, substantial ON-duty will be as shown by FIG. 11(d), so as to become a compensation signal for improving the input current distortion by means of inherent boost converter. Accordingly, an excess current at the hill portions of the source voltage can be restrained, and the average value waveform of the input current is improved as shown in FIG. 3 similarly to the foregoing.

Figure 7A:
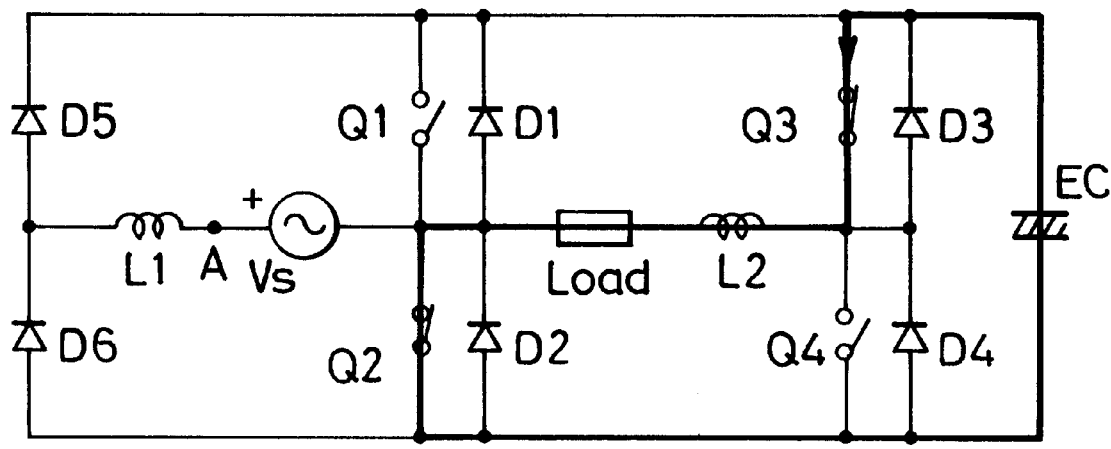
FIGS. 7(a) to 7(d) are circuit diagrams showing the operation of the basic control circuit of FIG. 5 at the hill portion of the input from the power source.
Figure 7B:
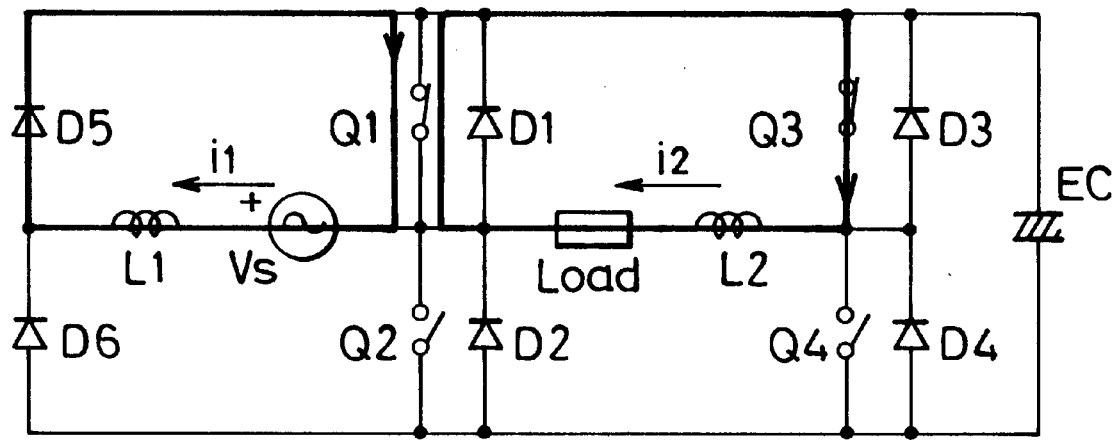
Figure 7C:
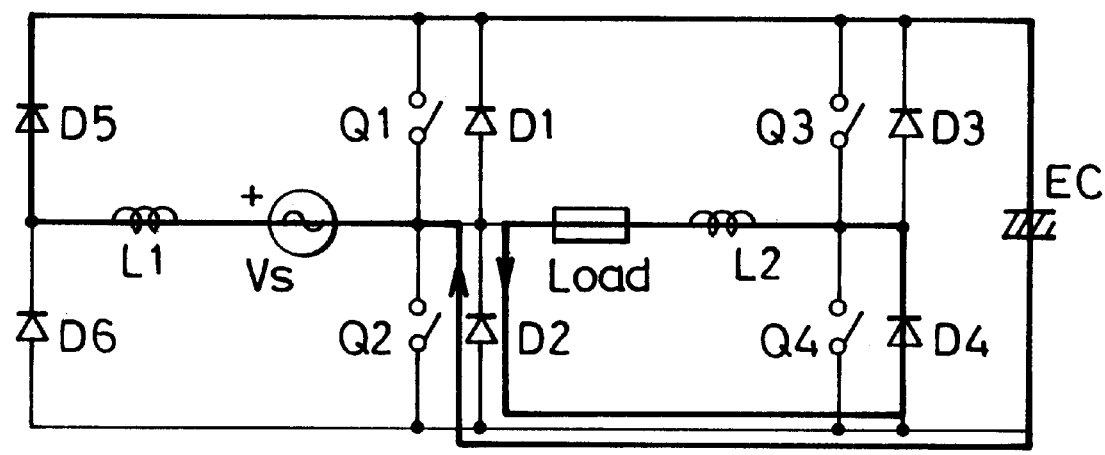
Figure 7D:
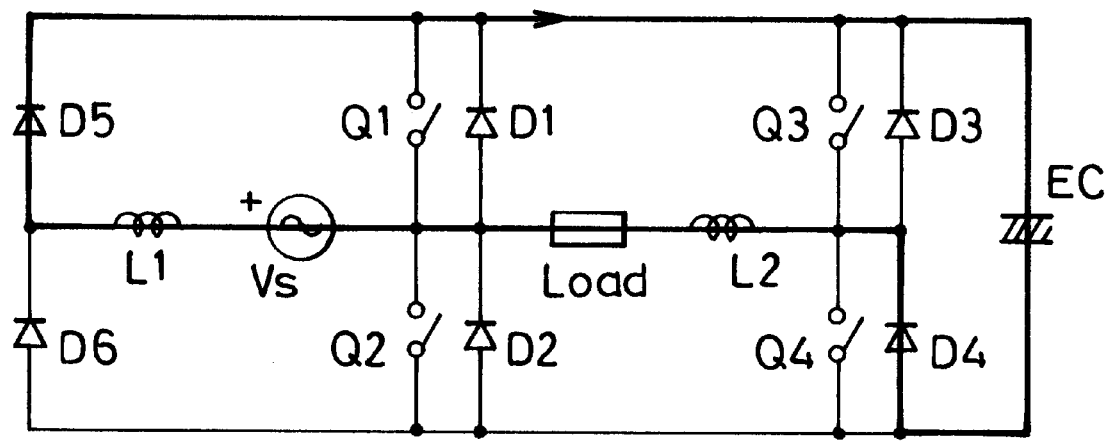
Figure 8A:
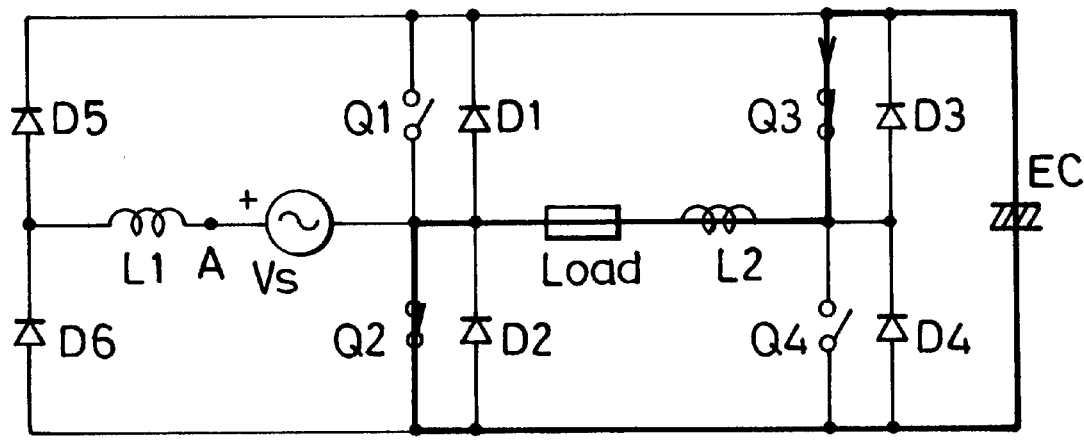
FIGS. 8(a) to 8(d) are circuit diagrams showing the operation of the basic control circuit of FIG. 5 at the valley portion of the input from the power source.
Figure 8B:
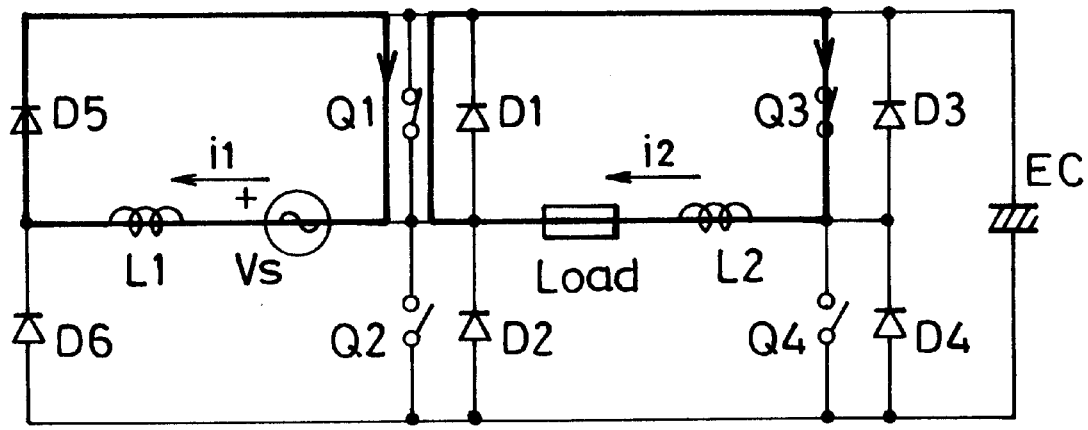
Figure 8C:
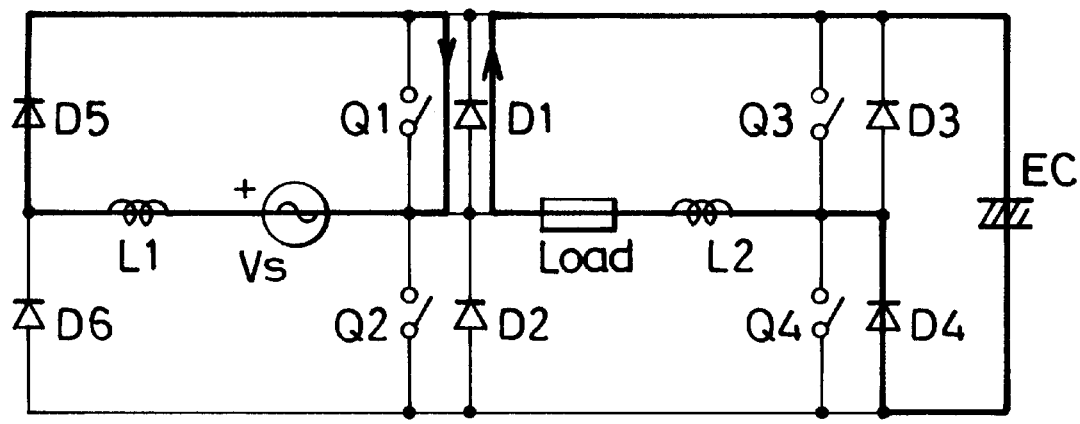
Figure 8D:
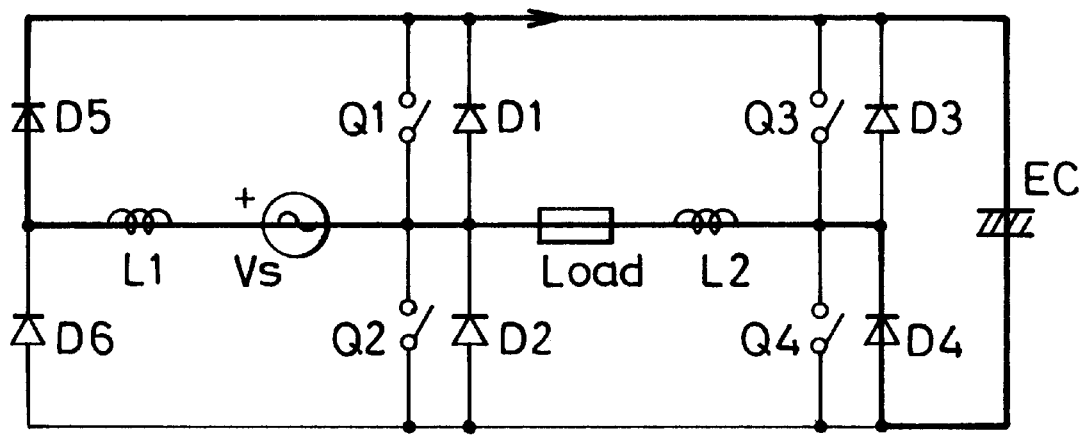
Figure 12:
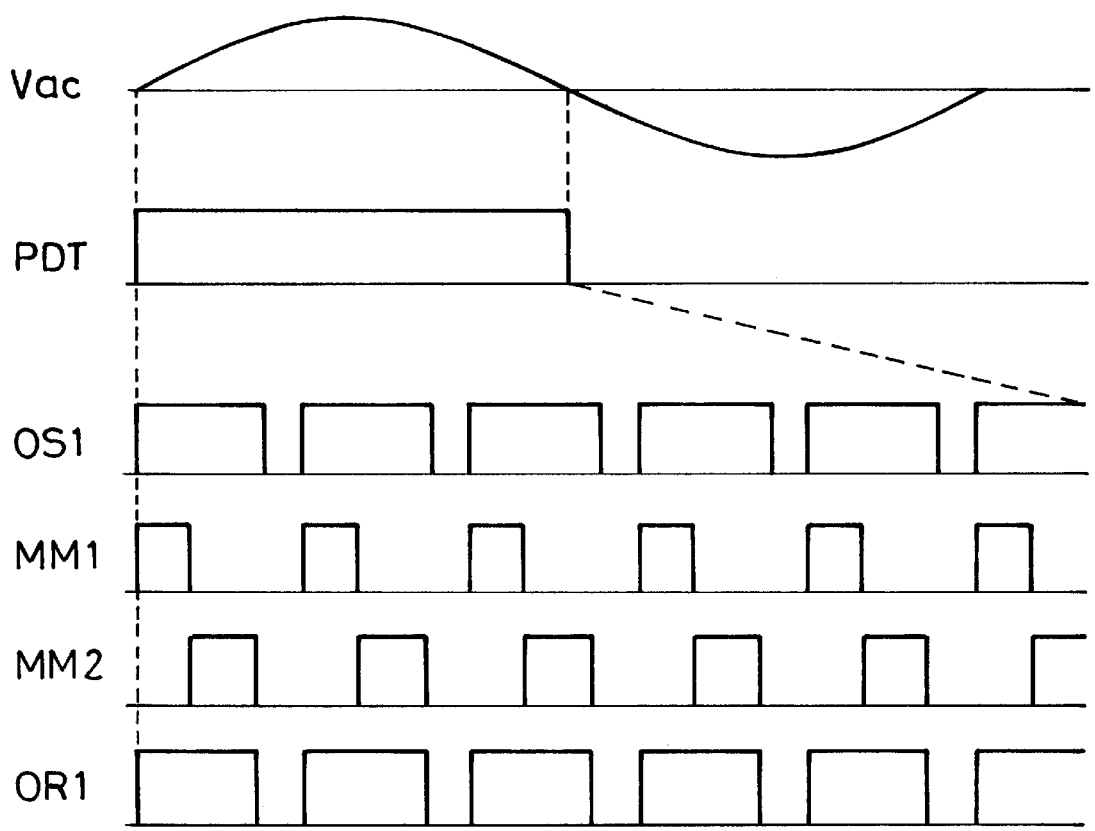
FIG. 12 is an operational waveform diagram for another embodiment of the present invention.
Figure 13:
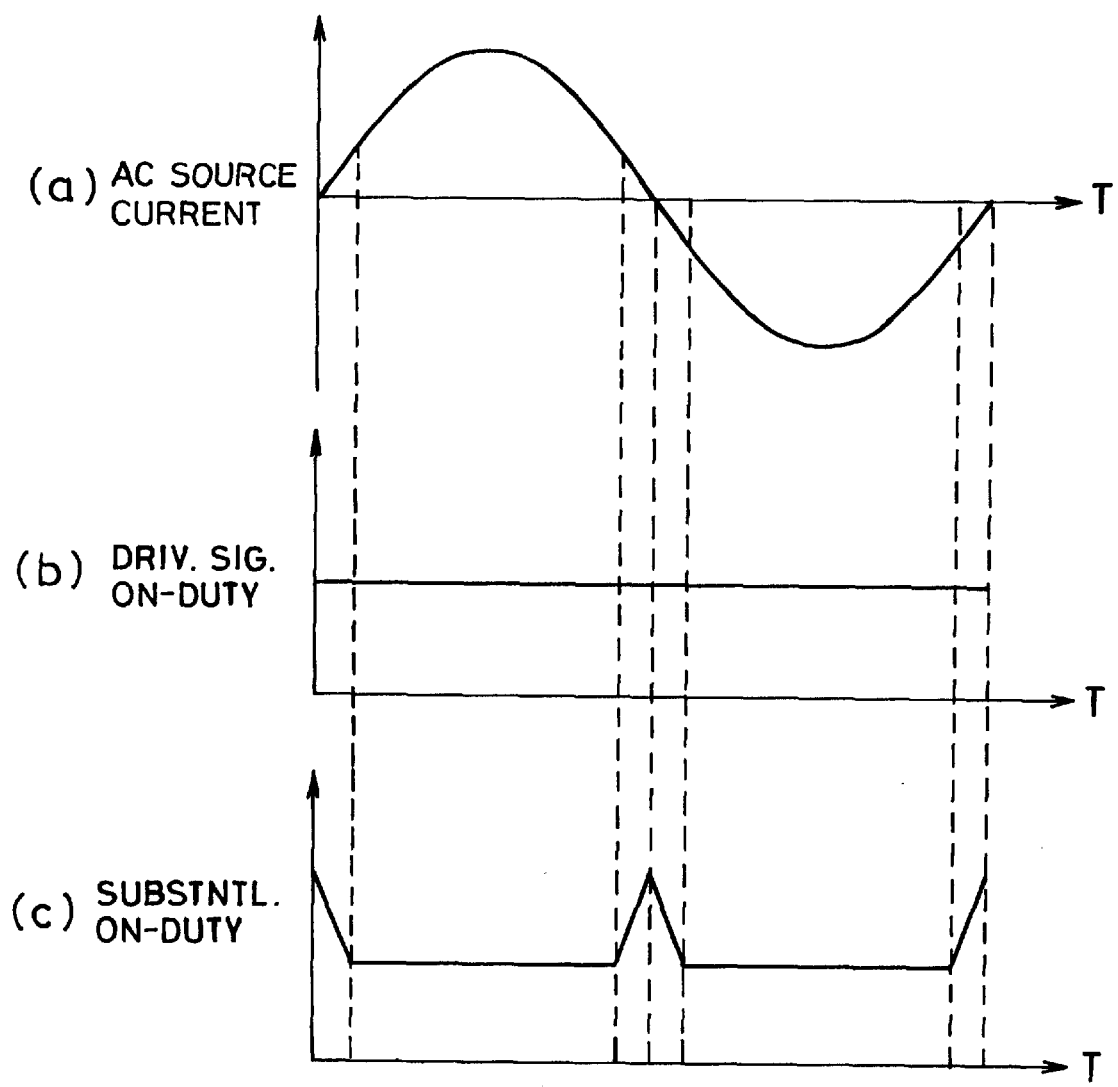
FIG. 13 is an explanatory waveform diagram for ON-duty variation in the control circuit of FIG. 12.

In FIG. 12, signal voltage waveforms at respective parts in the basic control circuit of FIG. 5 are shown for comparison with those in the present Embodiment. Due to that a pulse width of the monostable multivibrator MM2 is fixed in the basic arrangement, an input of the source current as in FIG. 13(a) causes the ON-duty of a driving signal to be fixed as shown in FIG. 13(b), and substantial ON-duty is made to be as shown in FIG. 13(c) by a conduction of the backward directional diodes of the switching elements Q1 and Q2. This phenomenon of the ON-duty at the valley portion becoming larger is caused by that ON time of the first voltage conversion circuit (boost converter) is substantially varied by a difference in the current path in the period T3, that is, the foregoing difference in the current paths shown in FIGS. 7(c) and 8(c), but it should be appreciated that this phenomenon is eliminated in the present Embodiment 3.

Embodiment 4

Figure 14:
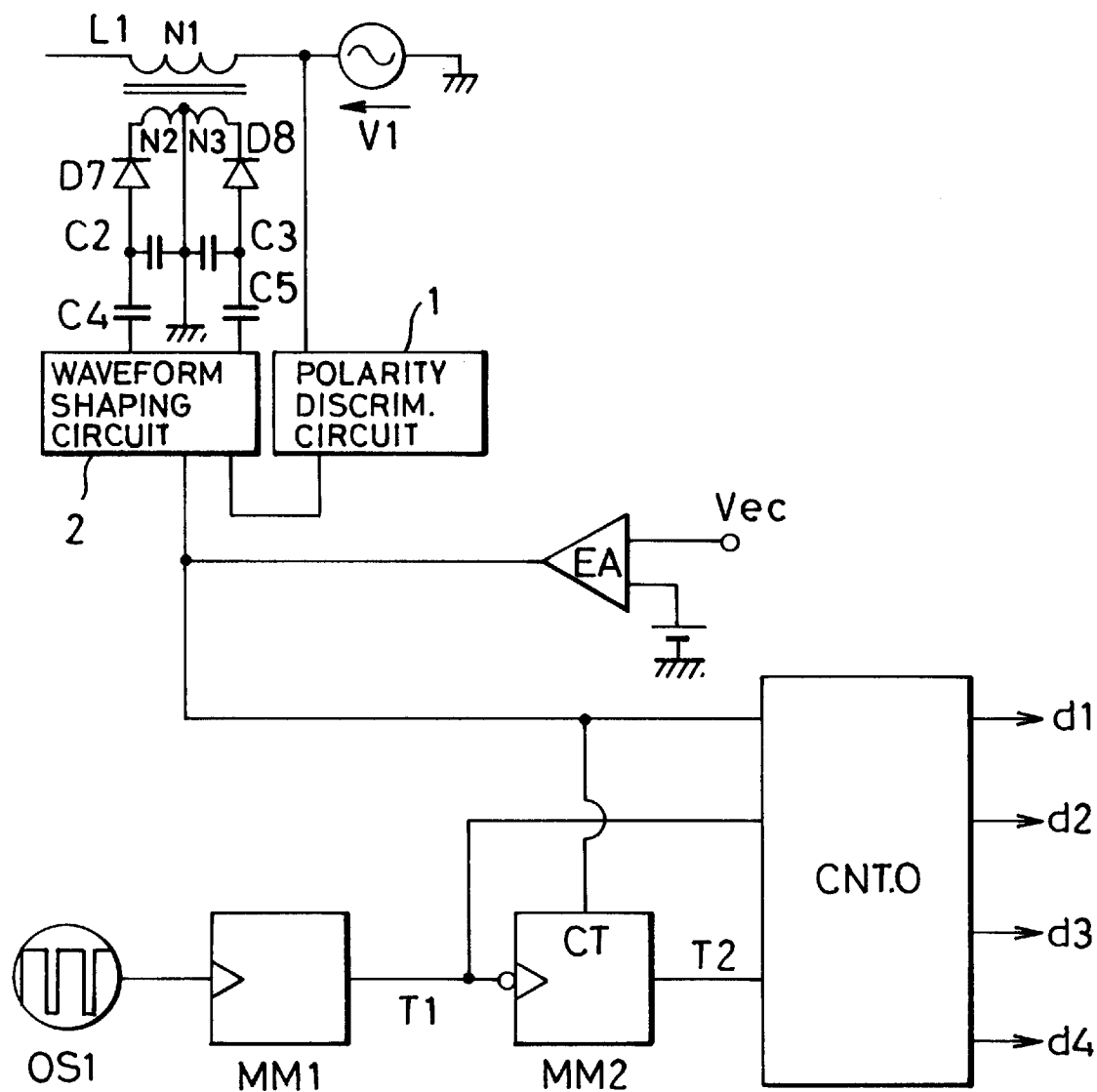
FIG. 14 is a block circuit diagram showing another embodiment of the control circuit according to the present invention.

In FIG. 14, a control circuit of Embodiment 4 according to the present invention is shown, in which a main circuit arrangement is provided, with respect to the foregoing circuit of FIG. 1, with secondary and tertiary windings N2 and N3 as added to the inductor L1. In this Embodiment 4, a voltage at the secondary winding N2 (FIG. 15(c)) and a voltage at the tertiary winding N3 (FIG. 15(d)) which are multiples at the turn ratio of the voltage (FIG. 15(b)) generated at the primary winding N1 of the inductor L1 are rectified by diodes D7 and D8, and their envelope voltages are detected by capacitors C2 and C3. As shown in FIGS. 15(e) and 15(f), further, DC voltage is cut out of these envelope voltages by means of capacitors C4 and C5, and the envelope voltages are waveform-shaped as in FIGS. 15(g) and 15(h) by removing one directional side by the polarity discrimination circuit 1. With addition of these waveform-shaped voltages to each other, a voltage of such waveform as in FIG. 15(i) from which lower voltage portion than the predetermined level of the source voltage V2 is cut is obtained, and this voltage is applied to the control input terminal CT of the voltage controlling monostable multivibrator MM2. The PWM control is performed such that, when the commercial AC source voltage Vs is lower than the predetermined voltage, the preliminarily set switching period T2 is maintained and, when the source voltage is higher than the predetermined voltage, the switching period T2 is shortened. The ON-duty at this time of the monostable vibrator MM2 will be as shown in the foregoing FIG. 11(c), whereby the excessive input current at the hill portion of the source voltage is prevented from flowing from the commercial AC source, and the average value waveform of the input current can be improved as shown in the foregoing FIG. 3.

What is claimed is:

1. A power source device for providing to a load circuit an AC voltage synchronized with an AC power source, the device comprising a first series circuit of first and second switching elements coinciding in their forward direction and respectively having a backward current passing element connected in parallel to the switching element, a second series circuit of third and fourth switching elements coinciding in their forward direction and respectively having a backward current passing element connected in parallel to the switching element, a third series circuit of two rectifying elements, a smoothing capacitor to which the first, second and third series circuits are connected in parallel, a first inductor connected through the AC power source between a junction point of the switching elements in the first series circuit and a junction point of the two rectifying elements in the third series circuit, and a second inductor connected through a load circuit between a junction point of the switching elements in the first series circuit and a junction point of the switching elements in the second series circuit; the arrangement constituting a boost converter connected to the AC source and including at least the switching elements and first inductor, a buck converter connected to the smoothing capacitor and including at least the switching elements and second inductor, and a control circuit for controlling the operation of the first to fourth switching elements such that at least one of the switching elements employed in the respective buck and boost converters is commonly used in these converters and the operation includes at least a period in which a current flowing upon a voltage boosting operation and a current flowing upon a voltage dropping operation flow through the commonly used switching elements respectively in a direction in which they cancel each other; wherein the device provides control states including first to third switching states, at the first state of which a closed circuit including the load circuit and second inductor is formed with respect to both ends of the smoothing capacitor and an open circuit including the first inductor is formed across the AC power source, at the second state of which a closed circuit including the first inductor is formed across the AC power source, and at the third state of which energy accumulated in the first and second inductor is discharged, the period of the first switching state being varied at least at one cycle of the AC power source.

2. The power source device according to claim 1 wherein the control circuit controls the operation of the switching elements with the period of the second switching state varied at least at one cycle of the AC power source.

3. The power source device according to claim 1 wherein the control circuit controls the operation of the switching elements so that the period of the first switching state is made longer than a predetermined value at the portion of the source voltage where the absolute value of the voltage is low in each cycle of the source voltage, and is made shorter at the portion of the source voltage where the absolute value is high.

4. The power source device according to claim 1 wherein the control circuit controls the operation of the switching elements so that the period of the second switching state is made longer than a predetermined value at the portion of the source voltage where the absolute value of voltage is low in each cycle of the source voltage, and is made shorter at the portion of the source voltage where the absolute value is high.

5. The power source device according to claim 3 wherein the control circuit controls the operation by detecting at least one of an input current, input voltage, output current, output voltage and voltage at the smoothing capacitor.

6. The power source device according to claim 4 wherein the control circuit controls the operation by detecting at least one of an input current, input voltage, output current, output voltage and voltage at the smoothing capacitor.

7. The power source device according to claim 1 wherein the control circuit is controlled for varying the second switching state in its period in response to voltage value of the AC source.

8. The power source device according to claim 1 wherein the control circuit is controlled for varying the second switching state in its period when instantaneous voltage of the AC source is below a predetermined value.

9. The power source device according to claim 1 wherein the control circuit is controlled for varying the second switching state in its period when a current of the second inductor becomes larger than a current of the first inductor immediately before termination of the period of the second switching state.

10. The power source device according to claim 1 wherein the control circuit is controlled for varying a switching period mainly for taking up a current from the smoothing capacitor in the first switching state, in response to an output to the load circuit.

11. The power source device according to claim 1 wherein the control circuit is controlled for rendering at least one of the output current and output voltage to the load circuit to be substantially constant for the period of the switching state.

12. The power source device according to claim 1 wherein the control circuit is controlled for rendering the output to the load circuit to be in a low frequency square wave.

13. The power source device according to claim 1 wherein the load circuit includes a discharge lamp.

14. The power source device according to claim 1 wherein the control circuit is controlled for varying the period of the second switching state at a zone of each cycle of the AC source where the AC source is higher than a predetermined voltage.

15. The power source device according to claim 1 wherein the control circuit is controlled for varying the switching period of the switching elements at the second switching state.

16. The power source device according to claim 1 wherein the control circuit is controlled for varying the switching period when the current of the second inductor becomes smaller than the current of the first inductor immediately before termination of the period of the second switching state.

17. The power source device according to claim 1 wherein the control circuit is controlled for varying the switching period of the second switching state in response to the envelope of the voltage occurring in the first inductor.

* * * * *